(12) United States Patent
Penny

(10) Patent No.: US 6,326,777 B2
(45) Date of Patent: *Dec. 4, 2001

(54) DEVICE FOR SENSING EDDY CURRENTS IN MOVING BODIES

(75) Inventor: William A. Penny, Brockenhurst (GB)

(73) Assignee: Penny & Giles International PLC, Dorset (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,390

(22) Filed: Jun. 16, 1998

(30) Foreign Application Priority Data

Jun. 17, 1997 (GB) ................................. 9712750

(51) Int. Cl.$^7$ ........................................... G01P 3/46
(52) U.S. Cl. .................. 324/164; 324/207.13; 73/514.39
(58) Field of Search ..................... 324/164, 173, 324/174, 207.13; 73/514.39, 519, 520, 660; 361/236, 239

(56) References Cited

U.S. PATENT DOCUMENTS

| 3,065,412 | * | 11/1962 | Rosenthal | 324/164 |
| 3,467,358 | * | 9/1969 | Zablotsky et al. | 73/660 |
| 3,932,813 | * | 1/1976 | Gallant | 324/164 |
| 4,441,077 | * | 4/1984 | Dodgen et al. | 324/164 |
| 4,518,917 | * | 5/1985 | Oates et al. | 324/207 |
| 4,751,459 | * | 6/1988 | Stupak, Jr. | 324/164 |
| 4,847,556 | * | 7/1989 | Langley | 324/207 |
| 5,942,893 | * | 8/1999 | Terpay | 324/207.18 |

FOREIGN PATENT DOCUMENTS

| 1209780 | 1/1966 | (DE). |
| 3314567 | 5/1984 | (DE). |
| 0 769 700 | 4/1997 | (EP). |
| 1004682 | 9/1965 | (GB). |
| 1 512 118 | 5/1978 | (GB). |
| 2 121 968 | 1/1984 | (GB). |
| 2 257 527 | 1/1993 | (GB). |

* cited by examiner

Primary Examiner—Christine Oda
Assistant Examiner—Subhash Zaveri
(74) Attorney, Agent, or Firm—Thomas Schneck

(57) ABSTRACT

A device for sensing velocity variations in a conductive body 10 moving through a magnetic gap 12 between two discrete portions 13, 14 of a magnetic circuit 15. The magnetic circuit 15 generates a magnetic flux 16 in the gap 12 to induce eddy currents 17 in the body 10 moving through the gap. The device includes an eddy current sensor defining at least one further gap 24 through which the body 10 is also moved, and at least one sensor coil 18. A voltage is induced in the coil by variations in the induced eddy currents. The voltage is detectable; providing an indication of variations, that is to say accelerations or decelerations, in velocity by providing two discrete magnetic circuit portions, the size and weight of the device be reduced while enhancing the ability to sense eddy currents. The device may be used in a vehicle to sense vibration, acceleration, or other motion.

31 Claims, 4 Drawing Sheets

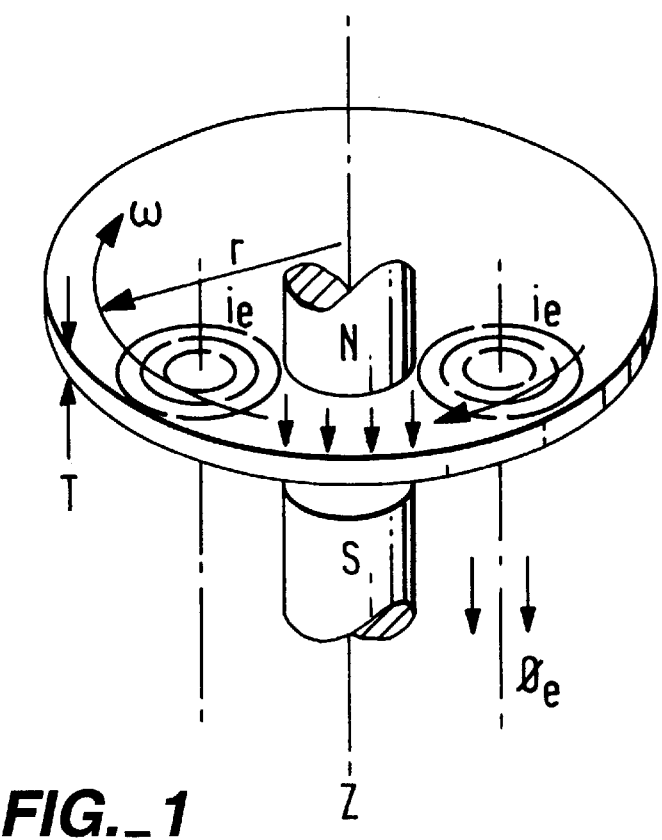
FIG._1
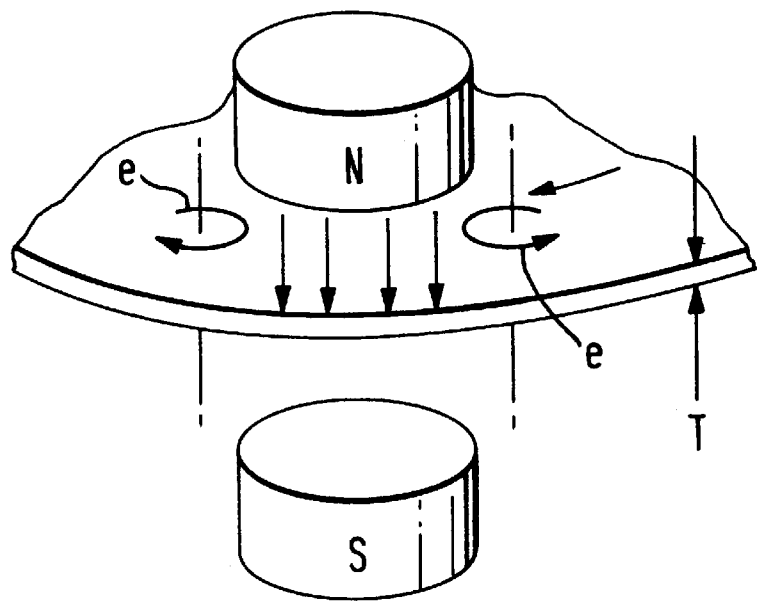
FIG._1a

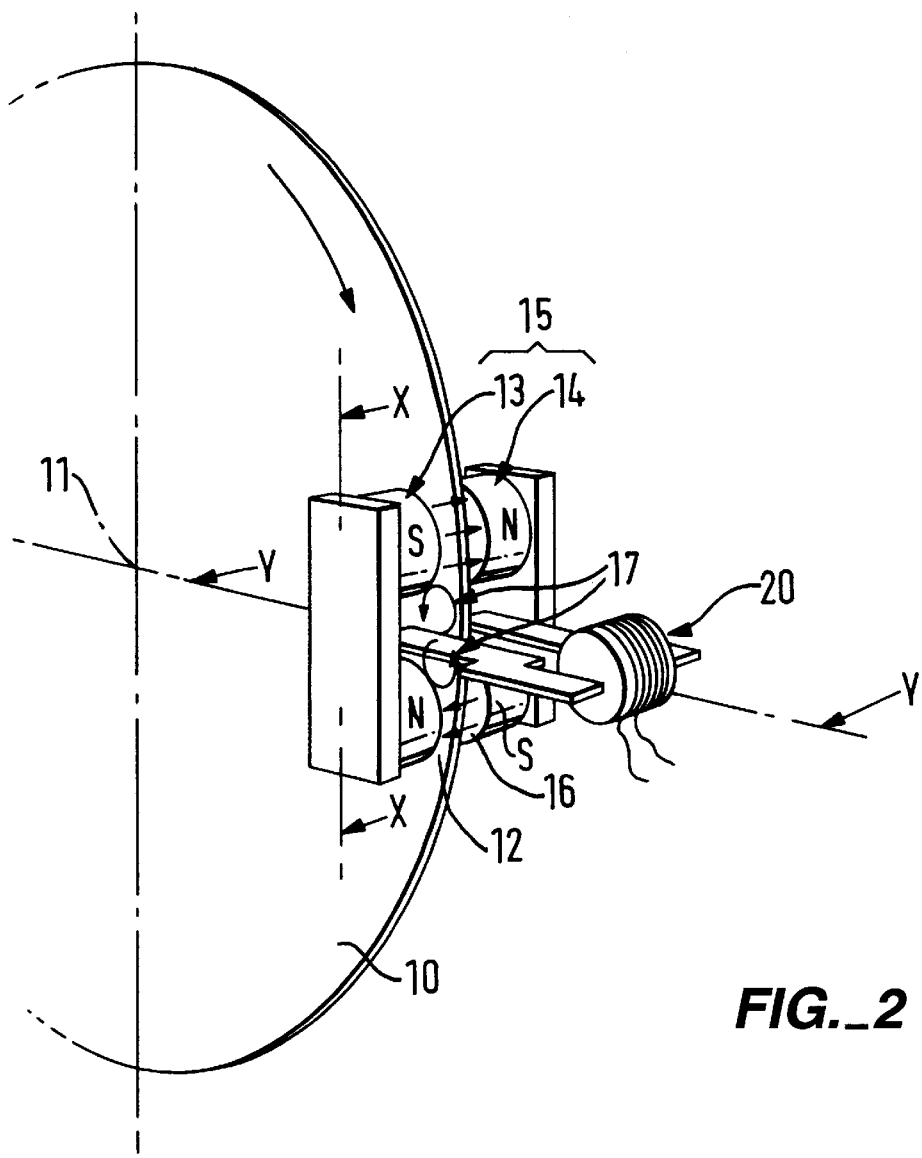
FIG._2
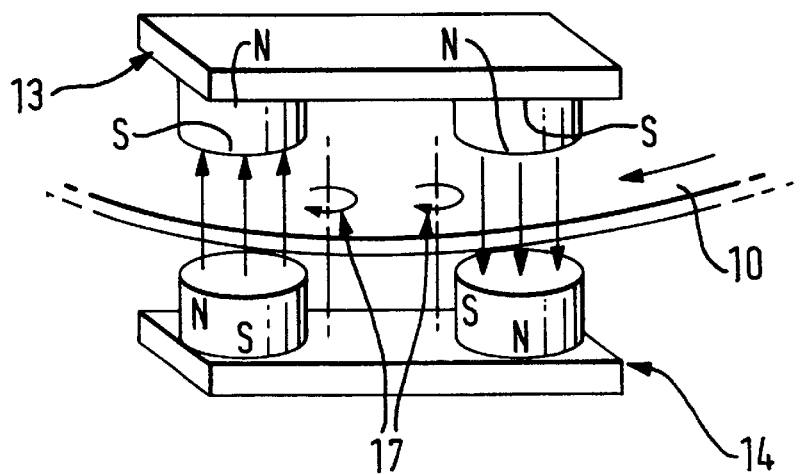
FIG._2a

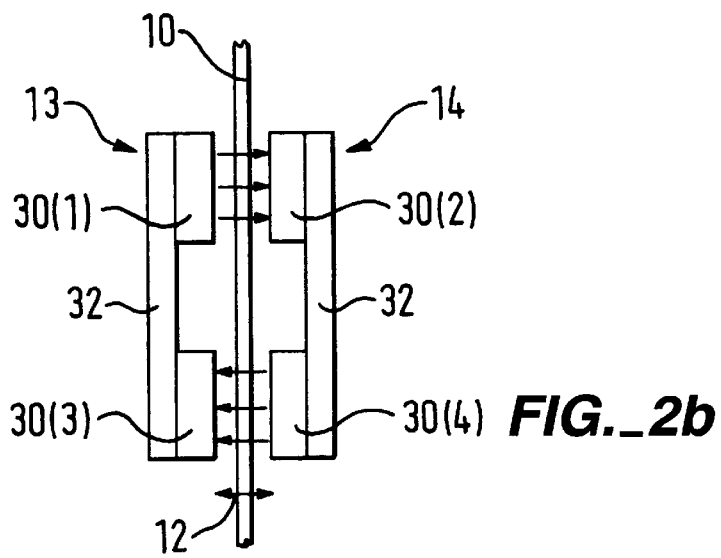
FIG._2b
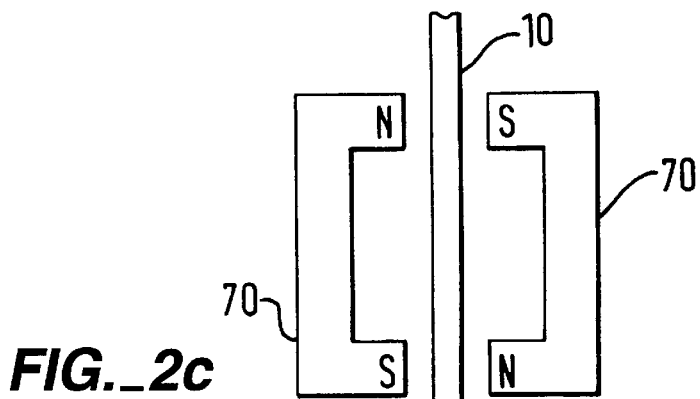
FIG._2c
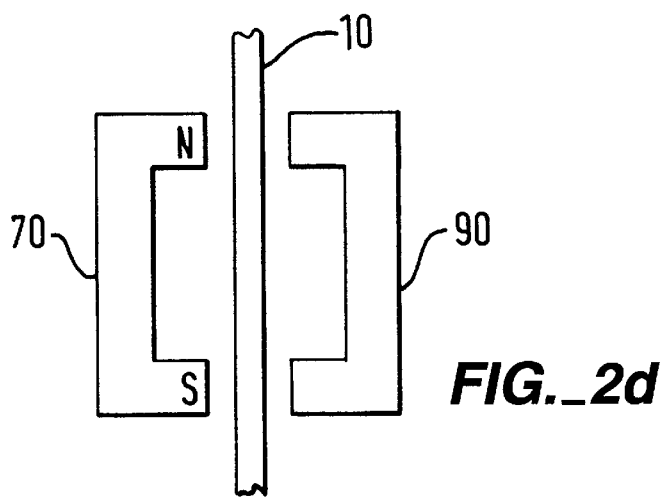
FIG._2d
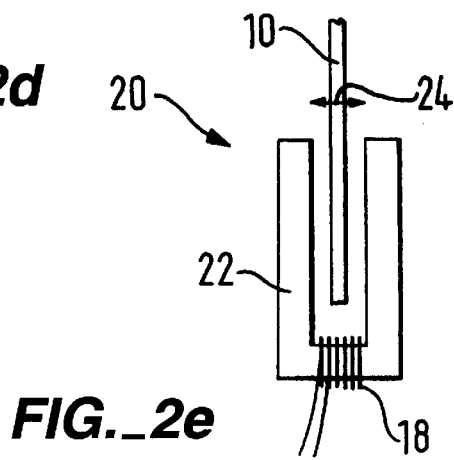
FIG._2e

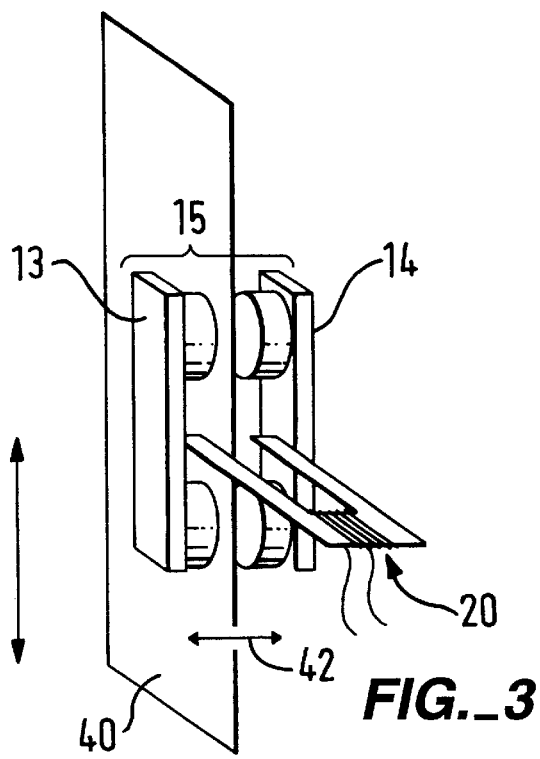
FIG._3
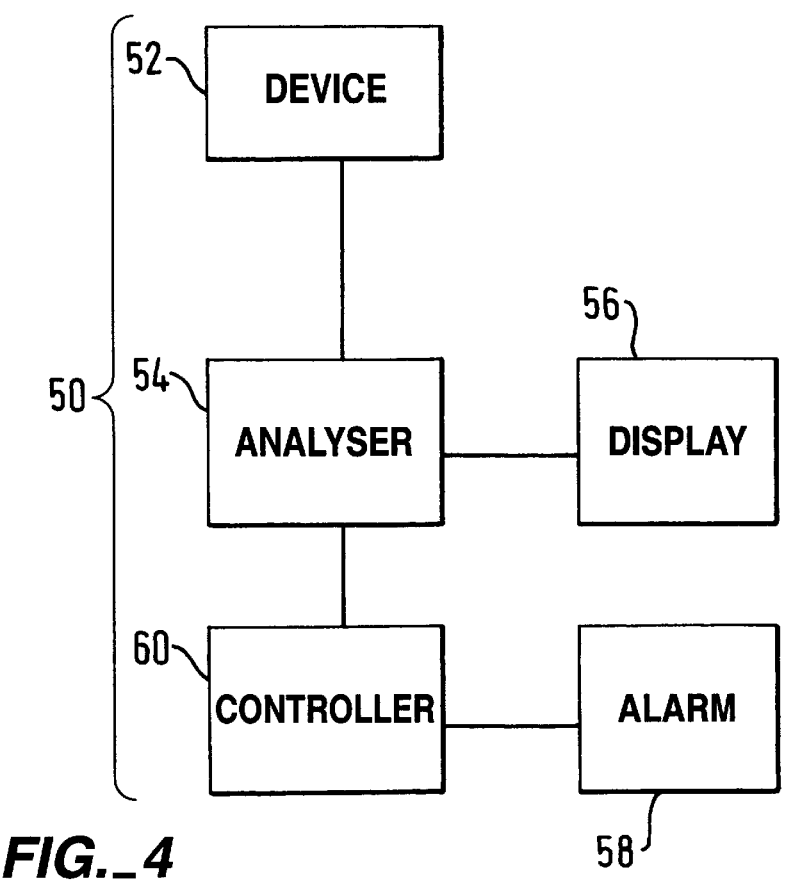
FIG._4

DEVICE FOR SENSING EDDY CURRENTS IN MOVING BODIES

BACKGROUND OF THE INVENTION

The invention relates to sensing devices, and more particularly to devices for sensing changes in the velocity of a moving body.

There are many applications in science and industry for apparatus to measure velocity accurately and particularly to sense changes in velocity. Such velocity could be peripheral i.e. tangential or rectilinear.

One illustrative application in which such sensors could find great utility is in the aviation industry, and more particularly in the field of helicopter, or rotary wing, aviation. For the purposes of illustration, the following discussion will refer to the field of helicopter aviation but it should be noted that the invention is not limited to this particular field and that it may be employed in any industry or field of technology wherein it is desired to sense changes in the velocity of a moving body.

It has previously been proposed to employ sensors to monitor various components of rotary wing aircraft to enable mechanical problems to be spotted and dealt with before they pose a threat to the safety of the aircraft.

A number of recent air accidents have shown that the powertrain, and more particularly the geartrain, of an aircraft is particularly vulnerable to mechanical problems. To counter this threat, it has previously been proposed to install sensors to monitor the condition of the powertrain and gearboxes in particular. One such sensor which has previously been employed comprises an inertia device, such as a piezoelectric sensor, which is mounted on the geartrain housing, for example, of the aircraft.

It was previously postulated that an inertia device, such as a piezoelectric sensor, would be suitable for sensing the degradation of the gears within the housing, as any such degradation would give rise to vibrations that would cause the piezoelectric device to be subjected to inertia forces whereupon a signal would be generated that could be monitored. However, it has been noted by the present inventor that these inertial devices do not provide an accurate indication of the state of the gears within the housing. As a result of this, it is not uncommon for engineers to strip a gearbox, for example, in response to a detected problem only to find that the geartrain is in fact operating properly. In other instances, geartrains have failed without the sensors indicating that there is a problem to be addressed. It is apparent therefore that inertial sensors are not suitable when used to infer from a detected vibration the integrity of rotating, or otherwise moving, members of an aircraft component.

A number of alternative sensors have previously been proposed. For example, U.S. Pat. No. 4,751,459, European Patent Specification No. 0769700 and United Kingdom Specification No. 2257527 each disclose a sensing device comprising substantially U-shaped magnetic yoke which is fittable over the edge of a rotatable body to provide an indication of changes in the rotation velocity of the body. Whilst these sensing devices adequately enable the velocity changes of a moving body to be detected, they have their own set of associated problems and as such are generally unsuitable for use in certain applications.

For example, practical investigations have determined a number of problems associated with the use of these previously proposed sensors in the illustrative field of rotary wing aviation. A first problem is associated with the fact that the above mentioned systems are inordinately massive. In any device employed in an aircraft it is a requirement that the mass (weight) of the component should be reduced consistent with satisfactory formation.

A second problem is associated with the fact that all of the previously proposed mechanisms necessitate the provision of a magnetic circuit that extends from one face of the rotating component around the periphery of the component to the other face thereof. This is disadvantageous as the extension of the sensor beyond the periphery of the component requires the component casing to be enlarged in order to accommodate the sensor. It has also been noted that the portion of the magnetic circuit extending around the periphery of the sensor represents a large proportion of the total weight of the sensor, and thus that the weight of the sensor could be significantly reduced if this portion of the magnetic circuit could be removed.

SUMMARY OF THE INVENTION

It is an object of the invention to address these and other problems associated with previously proposed sensing devices.

According to the invention there is provided a device for sensing velocity variations in a conductive body moving through a magnetic gap between two discrete portions of a magnetic circuit, the magnetic circuit generating a magnetic flux in the gap to induce eddy currents in the body moving therethrough, the device comprising eddy current sensor means defining at least one further gap through which the body is also moved, and at least one sensor coil having a voltage induced therein by variations in the induced eddy currents, said voltage being detectable to provide an indication of variations, that is to say accelerations or decelerations, in the velocity of the moving body.

Thus a voltage is induced in the sensor coil only when variations occur in the eddy currents and variations occur in the eddy currents only when the velocity of the moving body varies. Accordingly, the sensor produces an analogue of the eddy currents which is an analogue not of velocity but, since it measures the variations in the flux from the eddy currents, of acceleration. If there is no rate of change in flux, no voltage will be induced in the sensor coil, that is to say in a steady state of no velocity changes there will be no output from the sensor coil.

Preferably, the two discrete portions of the magnetic circuit comprise a first permanent magnet having a north pole and a south pole, and a second permanent magnet having a north pole and a south pole, the first magnet being provided on one side of the moving body, and the second magnet being provided on the other side of the moving body such that the second magnet north pole opposes the first magnet south pole and the second magnet south pole opposes the first magnet north pole.

Alternatively, the two discrete portions of the magnetic circuit may comprise a permanent magnet provided on one side of the moving body and a body of soft magnetic material provided opposite the permanent magnet on the other side of the moving body.

As a further alternative, the two discrete portions of the magnetic circuit may comprise a first magnet having a north pole piece and a south pole piece interconnected by a body of soft magnetic material and provided on one side of the moving body, and a second magnet having a north pole piece and a south pole piece interconnected by a body of soft magnetic material and provided on the other side of moving body with the second magnet north pole piece arranged opposite the first magnet south pole piece and the second magnet south pole piece arranged opposite the first magnet north pole piece.

As a further alternative, the two discrete portions of the magnetic circuit may comprise a first magnet having a north pole piece and a south pole piece interconnected by a body of soft magnetic material and provided on one side of the moving body and a body of soft magnetic material provided opposite the first magnet on the other side of the moving body.

Alternatively, the two discrete portions of the magnetic circuit may comprise a first permanent magnet having a north pole and a south pole and provided on one side of the moving body, and a second magnet having a north pole piece and a south pole piece interconnected by a body of soft magnetic material and provided on the other side of the moving body, and first magnet north pole being provided opposite the second magnet south pole and the first magnet south pole being provided opposite the second magnet north pole.

Preferably, the magnetic flux is generated in a direction perpendicular to the plane of the moving body.

The eddy current sensing means may comprise one substantially c-shaped magnetic yoke having a sensor coil mounted thereon. Alternatively, the eddy current sensing means may comprise a plurality of substantially c-shaped magnetic yokes each having a sensor coil mounted thereon. In either case, it is preferred that the or each of the magnetic yokes extend at least partway between the two discrete components of the magnetic circuit.

The moving body may be a rotating conductive disc and/or a component of a powertrain.

In accordance with a further aspect of the invention, there is provided a rotating wing aircraft or helicopter comprising a device as described herein.

The moving body may comprise a conductive strip rectilinearly movable back and forth through the gap. The strip may be mounted to or may form part of a component of a motor vehicle, the device being operable to provide an indication of the vibration of the vehicle.

A further aspect of the invention provides a vehicle comprising a device as described herein.

A further aspect of the invention provides a monitoring system comprising a device as described herein, and an analyser for analysing signals output by the eddy current sensing means.

The system may comprise means for providing an indication of the integrity of the moving body based upon the signals analysed by the analyser. The means for providing an indication may comprise a display.

The system may comprise an audible or visual alarm that is triggered if the analyser should determine that the integrity of the moving body is at risk.

Preferably, the analyser comprises a spectrometer that is operable to monitor frequency harmonics induced in the moving body as a result of velocity variations induced therein, said variations being caused by a reduction in the integrity of the moving body.

A further aspect of the invention provides a system for determining the performance of a component, the system comprising one or more sensing devices provided on a respective input to the component, one or more sensing devices provided on a respective output from the component, and analyser for determining the performance of the component based upon a comparison of signals generated by the input and output sensing devices. The component may form part of a powertrain. One or more of said sensors may comprise a sensing device as described herein. Preferably, the analyser also provides an indication of the integrity of the component.

BRIEF DESCRIPTION OF THE DRAWINGS

The invention is illustrated diagrammatically by way of example in the accompanying drawings, in which:

FIG. 1 is a schematic view illustrating the physical principles behind aspects of the invention.

FIG. 1a is a schematic representation of eddy currents induced in the arrangement of FIG. 1.

FIG. 2 is a representation of a first embodiment of the invention.

FIG. 2a is a schematic representation of eddy currents induced in the arrangement of FIG. 2.

FIG. 2b is a cross sectional view through the line X—X of FIG. 2 showing a magnetic circuit.

FIG. 2c is a cross-sectional view through an alternative magnetic circuit.

FIG. 2d is a cross-sectional view through a further alternative magnetic circuit.

FIG. 2e is a cross sectional view along the line Y—Y of FIG. 2 showing a sensor means.

FIG. 3 is a representation of a second embodiment of the invention.

FIG. 4 is a schematic representation of a monitoring system.

BEST MODE FOR CARRYING OUT THE INVENTION

Aspects of the invention will now be described with particular reference to the field of helicopter aviation. However, it should be noted that the description of aspects of the invention in relation to this particular field is only illustrative and that aspects of the invention can find utility in a great many alternative implementation and/or technical fields.

Referring to the drawings, in the arrangement illustrated in FIG. 1 a disc of thickness, T, and specific resistance, $\rho$, is rotating between the poles of a permanent magnet such that the centre of area, a, of the magnetic flux, $\phi$, is a distance, r, from the axis, Z, about which the disc is rotating at an angular velocity, $\omega$.

It can be shown that magnetic flux will result due to the eddy currents, $i_e$, induced in the disc in the direction illustrated in FIG. 1a and the magnitude of the eddy current is given by:

$$i_e \propto \beta \cdot \omega r \frac{T}{\rho} \qquad (1)$$

where $i_e$=eddy current

B=magnetic flux density or B=$\phi$/a $\phi$=magnetic flux a=area

T=thickness of disc and $\rho$=specific resistance $\phi_e$=flux due to eddy current Voltage due to eddy current $V_e$ is given by $$V_e = N \frac{d\phi_e}{dt} \tag{2}$$

where N=number of turns interlinking flux when B, r, T and ρ are constant then from 1:

$$\frac{di_e}{dt} = k_1 \frac{d\omega}{dt} \tag{3}$$

where $k_1$ is a constant.

Since flux due to eddy current, $i_e$, is a function of angular velocity, then from equations 2 and 3 the voltage $i_e$, proportional to angular acceleration may be derived from:

$$\frac{d\phi_e}{dt} = k_2 \frac{di_e}{dt} = k_1 \cdot k_2 \cdot \frac{d\omega}{dt} \tag{4}$$

where $k_2$ is a constant.

Clearly from 2 and 4

$$V_e = k_3 \cdot \frac{d\omega}{dt} \tag{5}$$

where $k_3$ is a constant.

From this it can be seen that when angular velocity is uniform (steady state) then $$\frac{d\omega}{dt} = 0 \text{ and } V_e = 0$$

Perturbations in angular velocity will give rise to values of dω/dt and hence values of $V_e$. Thus $V_e$ integrated with respect to time provides a measure of angular velocity variations with respect to time and hence the parameter $$\sum V_e dt = K_3 \int \frac{d\omega}{dt} \cdot dt$$

can be considered as an analogue of non-uniformity of angular velocity.

FIG. 1a illustrates eddy current "e" induced in the disc on either side of the magnet. As can be seen from FIG. 1a, the eddy currents are induced in a different direction to one another. This side effect of the arrangement of FIG. 1 decreases the magnitude of any detected signal and thus serves to reduce the sensitivity of the sensing device to spurious electromagnetic sources.

In the embodiment of FIG. 2, a disc 10 is rotatable about an axis of rotation 11 and passes through a gap 12 between components 13 and 14 of a magnetic circuit 15. As can be seen in FIGS. 2 and 2a, the disc 10 passes through magnetic flux 16 between the components 13 and 14, and eddy currents 17 are thereby induced in the disc 10. The disc must be electrically conductive and in most implementations will be a conductive metal.

Variations in the eddy currents induced in the disc can be sensed by eddy current sensor means 20 provided, in the embodiment shown, between component 13 and 14. In an alternative embodiment, a pair of sensor means 20 may be provided. Note that the second sensor means has been omitted from FIG. 2a for clarity.

As can be seen from FIG. 2a, the particular arrangement of the components 13 and 14 causes the eddy currents 17 to be generated in the same direction. As a result of this, the sensitivity problems associated with the arrangement of FIG. 1 are alleviated as any detected signal is related to a sum of the eddy currents. Furthermore, if two eddy current sensing means are provided (as in the preferred embodiment), then the signal to noise ratio of the system will be further enhanced as the detected signals from the two sensing means can be summed prior to the determination of whether or not the moving body has degraded. Of course, more than two sensing means may be provided if desired.

One embodiment of eddy current sensor means 20 is shown in FIG. 2e and comprises a magnetic yoke 22 defining a gap 24 in which the disc 10 is disposed and a sensor coil 18. Detection means (not shown in FIG. 2a) are provided to detect a voltage induced in the coil 18 and current which consequently flows therein. If the speed of rotation of the disc 10 is completely constant then since the eddy currents induced in the disc will be uniform and the sensor means 20 will not have a voltage induced in the coil 18. If a pair of sensor means are provided, then it is preferred that the sensor coils 18 of each sensor means are connected either in series or parallel with one another.

In the embodiment depicted in FIG. 2b, the magnetic circuit comprises two discrete components which each comprise a pair of pole pieces 30 interconnected by a member 32 of suitable soft magnetic material. In an alternative embodiment shown in FIG. 2c, the components could each comprise a bar magnet 70. In a yet further embodiment shown in FIG. 2d, one component could comprise a bar magnet 70 (or alternatively a pair of pole pieces interconnected by a member of a suitable soft magnetic material) and the other component could comprise a member 90 of soft magnetic material provided on the other side of the disc to complete the magnetic circuit between the two poles of the bar magnet.

If the speed of rotation of the disc varies then the distribution of the induced currents will vary and voltages will be induced in the coil 18 and can be detected by suitable detecting equipment.

The pole pieces of the components provide a flux in a direction perpendicular to the plane of the disc. As shown in FIG. 2b, the pole pieces are arranged in the preferred embodiment such that a first pole piece 30(1) of the first component 13 is of opposite polarity to a first pole piece 30(2) of the second component (14). Similarly, a second pole piece 30(3) of the first component 13 is of opposite polarity to the first piece 30(1) and to a second pole piece 30(4) of the second component.

Although a rotary disc is shown in the figures, it will be appreciated that the disc could be of any other shape such as a uniform member capable of rectilinear movement through the gaps 12. Similarly, it should be noted that the disc could have teeth provided in the periphery thereof.

FIG. 3 shows just such an arrangement where the disc is a conductive strip 40 movable back and forth through a gap 42 between components 13 and 14 of a magnetic circuit 15.

As mentioned above, the arrangement of FIG. 2 finds particular, but not exclusive, utility in the field of rotary wing aviation and can be used to monitor velocity changes in a component of a geartrain of a rotor of the aircraft, for example. The arrangement shown in FIG. 2 is advantageous over the above described previously proposed arrangements as the magnetic circuit does not extend around the periphery of the disc and thus can be significantly reduced in size and hence weight. Furthermore, as the eddy currents are induced in the same direction so the strength of any detected signal is improved.

The arrangements shown in FIG. 3 finds particular, but not exclusive, utility as a vibration sensor for motor vehicles for example. In such an implementation, the strip 40 would typically be mounted to or comprise a part of a component of the vehicle and vibration thereof would give rise to detectable eddy currents that provide an indication of changes in velocity of the strip and hence of the degree of vibration to which the strip is subjected. As an example, the strip could be connected to suspension component of the vehicle.

In an alternative implementation, the sensing device could be mounted on a stationary engine, for example, and used to monitor the performance of the powertrain. The sensing device could alternatively be used on any other kind of powertrain.

FIG. 4 schematically illustrates a monitoring system employing at least one device as herein described. As shown, the system 50 comprises a device 52 as herein described, an analyser 54, a display 56, an alarm 58 and a controller 60.

In use, on a helicopter for example, the at least one device 52 generates signals which are passed to the analyser 54. The analyser 54 preferably comprises a spectrometer using a fast fourier transform, for example, to measure the induced voltage at particular velocity variation frequencies. A graph of the measured voltage against frequency is displayed on the display 56 and the controller is operable to monitor the measured voltage and to activate the alarm if the measured voltage should exceed a predetermined threshold.

In this way, a reduction in the integrity of the moving body will give rise to an acceleration or a deceleration of the body that will in turn cause a voltage signal to be sensed by the eddy current sensing means. As the integrity of the body continues to reduce, so the change in velocity increases and the magnitude of the measured voltage signal will increase until the controller determines that the measured voltage has exceeded a predetermined threshold and activates the alarm thereby warning the occupants of the helicopter, for example, that a problem has occurred and that they should take appropriate action.

The arrangement of FIG. 4 provides, in one embodiment, a system that enables a comparison to be made between data derived from elements within a powertrain to assess the performance of those elements. The data acquired may also be used to derive trends in the status of the elements of the powertrain.

It will be understood that aspects of the invention have been described herein by way of example only and that modifications may be made within the spirit and scope of the invention.

What is claimed is:

1. A device for sensing velocity variations in a conductive body moving through a pair of magnetic gaps between two discrete portions of a magnetic circuit, said two portions unattached from each other and separated by a space, the magnetic circuit generating magnetic flux in each of the gaps to induce eddy currents in the body moving therethrough, the device comprising eddy current sensor means defining at least one further gap through which the body is also moved, and at least one sensor coil having a voltage induced therein by variations in the induced eddy currents, said voltage being detected to provide an indication of variations, that is to say accelerations or decelerations, in the velocity of the moving body.

2. A device according to claim 1, wherein a voltage is induced in the sensor coil only when variations occur in the eddy currents and variations occur in the eddy currents only when the velocity of the moving body varies.

3. A device according to claim 1, wherein the two discrete portions of the magnetic circuit comprise a first permanent magnet having a north pole and a south pole, and a second permanent magnet having a north pole and a south pole, the first magnet being provided on one side of the moving body, and the second magnet being provided on the other side of the moving body such that the second magnet north pole opposes the first magnet south pole and the second magnet south pole opposes the first magnet north pole.

4. A device according to claim 1, wherein the two discrete portions of the magnetic circuit comprise a permanent magnet provided on one side of the moving body and a body of soft magnetic material provided opposite the permanent magnet on the other side of the moving body.

5. A device according to claim 1, wherein the two discrete portions of the magnetic circuit comprise a first magnet having a north pole and a south pole piece interconnected by a body of a soft magnetic material and provided on one side of the moving body, and a second magnet having a north pole piece and a south pole piece interconnected by a body of soft magnetic material and provided on the other side of moving body with the second magnet north pole piece arranged opposite the first magnet south pole piece and the second magnet south pole piece arranged opposite the first magnet north pole piece.

6. A device according to claim 1, wherein the two discrete portions of the magnetic circuit comprise a first magnet having a north pole piece and a south pole piece interconnected by a body of soft magnetic material and provided on one side of the moving body and a body of soft magnetic material provided opposite the first magnet on the other side of the moving body.

7. A device according to claim 1, wherein the two discrete portions of the magnetic circuit comprise a first permanent magnet having a north pole and a south pole and provided on one side of the moving body, and a second magnet having a north pole piece and a south pole piece interconnected by a body of soft magnetic material and provided on the other side of the moving body, the first magnet north pole being provided opposite the second magnet south pole and the first magnet south pole being provided opposite the second magnet north pole.

8. A device according to claim 1, wherein the magnetic flux is generated in a direction perpendicular to the plane of the moving body.

9. A device according to claim 1, wherein the eddy current sensing means comprises one substantially c-shaped magnetic yoke having a sensor coil mounted thereon.

10. A device according to claim 9, wherein the magnetic yoke extends at least partway between the two discrete components of the magnetic circuit.

11. A device according to claim 1, wherein the eddy current sensing means comprises a plurality of substantially c-shaped magnetic yokes each having a sensor coil mounted thereon.

12. A device according to claim 11, wherein each of the magnetic yokes extends at least partway between the two discrete components of the magnetic circuit.

13. A device according to claim 1, wherein the moving body is a rotating conductive disc.

14. A device according to claim 1, wherein the moving body is a component of a powertrain.

15. A device according to claim 1, wherein said device is located on a rotating wing aircraft.

16. A device according to claim 1, wherein the moving body comprises a conductive strip rectilinearly movable back and forth through the gap.

17. A device according to claim 16, wherein the strip is a component of a motor vehicle, the device being operable to provide an indication of the vibration of the vehicle.

18. A device according to claim 1, wherein said device is mounted on a vehicle.

19. A device according to claim 17, wherein said device is mounted on a vehicle.

20. Use of a device according to claim 1 for sensing changes in the velocity of a moving body.

21. A monitoring system comprising a device according to claim 1, and an analyser for analysing signals output by the eddy current sensing means.

22. A system according to claim 21, comprising means for providing an indication of the integrity of the moving body based upon the signals analysed by the analyser.

23. A system according to claim 22, wherein the means for providing an indication comprises a display.

24. A system according to claim 21, comprising an audible or visual alarm that is triggered if the analyser should determine that the integrity of the moving body is at risk.

25. A system according to claim 21, wherein the analyser comprises a spectrometer that is operable to monitor frequency harmonics induced in the moving body as a result of velocity variations induced therein, said variations being caused by a reduction in the integrity of the moving body.

26. A system for determining the performance of a component, the system comprising one or more sensing devices provided on a respective input to the component, one or more sensing devices provided on a respective output from the component, and an analyser for determining the performance of the component based upon a comparison of signals generated by the input and output sensing devices, wherein one or more of said sensors includes a device for sensing velocity variations in a conductive body moving through a pair of magnetic gaps between two discrete portions of a magnetic circuit, said two portions unattached from each other and separated by a space, the magnetic circuit generating a magnetic flux in each of the gaps to induce eddy currents in the body moving therethrough, the device comprising eddy current sensor means defining at least one further gap through which the body is also moved, and at least one sensor coil having a voltage induced therein by variations in the induced eddy currents, said voltage being detected to provide an indication of variations, that is to say accelerations or decelerations, in the velocity of the moving body.

27. A system according to claim 26, wherein the component forms part of a powertrain.

28. A system according to claim 26, wherein one or more of said sensors comprise a sensing device according to claim 1.

29. A system according to claim 26, wherein the analyser also provides an indication of the integrity of the component.

30. The use of claim 20 wherein said moving body is a rotating disk, tangential acceleration of said disk creating eddy currents which add while radial acceleration of said disk creating eddy currents which cancel out and acceleration perpendicular to the plane of rotation of said disk creating no eddy currents, wherein sensing of said velocity changes of said body is insensitive to all acceleration other than tangential acceleration in the direction of primary movement of the disk.

31. The use of claim 20 wherein said moving body is a strip with a primary direction of motion passing through both gaps of the device, the signal output being insensitive to all acceleration other than in said primary direction of motion.

* * * * *